May 25, 1943.  O. R. FROST  2,320,229
MILKING APPARATUS
Filed March 18, 1940
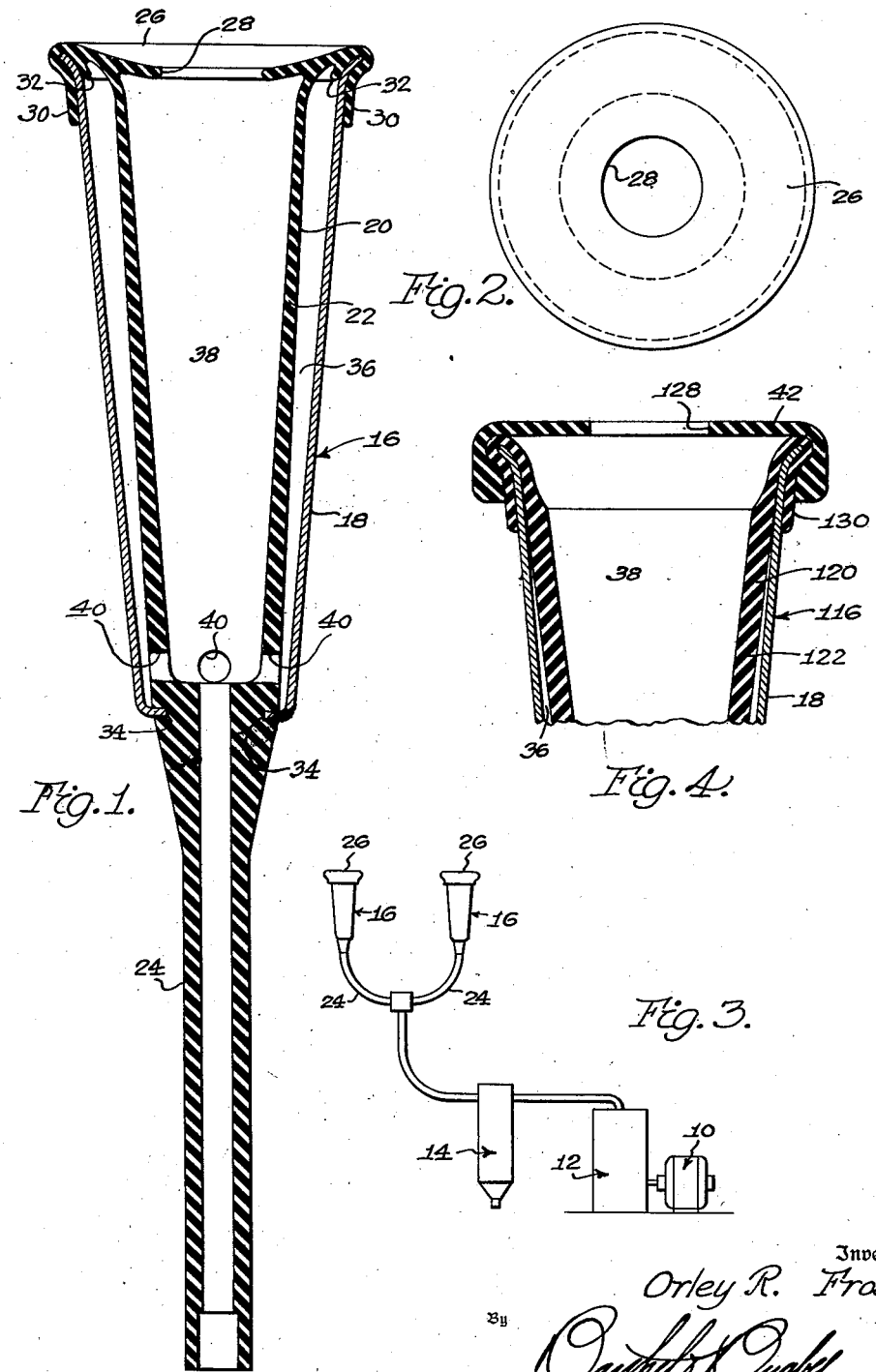

Patented May 25, 1943

2,320,229

UNITED STATES PATENT OFFICE 2,320,229

MILKING APPARATUS

Orley R. Frost, Port Huron, Mich.

Application March 18, 1940, Serial No. 324,598

2 Claims. (Cl. 31—84)

This invention relates, in general, to mechanical milking apparatus and, in particular, to a new and improved teat cup device for employment therewith.

One of the objects of this invention is to provide a new and improved teat cup device for a mechanical milking apparatus so that the latter may, by employing said device, be of simpler construction and design than heretofore while still maintaining a high milking efficiency.

Another object is to provide a new and improved teat cup device which is so constructed and designed that the mechanical milking apparatus employable therewith may be simpler and less costly than heretofore and productive of more efficient results.

Another object is to provide for a mechanical milking apparatus having a source of suction a new and improved teat cup device which is capable of alternately pulling and squeezing the teat during the milking operation in a manner more closely simulating hand milking or the sucking of a calf than heretofore and, therefore, more satisfactory to the cow and resultingly productive of a higher milk output.

Another object is to provide for a mechanical milking apparatus having a source of suction a new and improved teat cup device which is capable of subjecting the teat, substantially in its entirety, to the drawing or pulling effect of said suction and of thereafter subjecting said teat, also substantially in its entirety as well as substantially automatically, to a squeezing effect in the absence of said suction, so as to subject said teat, in a simple and efficient manner, to the double action so necessary for high milk output, comfort to the cow and complete milking, and without the usual deleterious effects of hand stripping.

Other objects and advantages of the invention will become readily apparent from a reference to the following specification taken in conjunction with the accompanying sheet of drawings wherein:

Fig. 1 is a vertical section through the new and improved teat cup assembly;

Fig. 2 is a plan view of the teat cup assembly shown in Fig. 1;

Fig. 3 is a diagrammatic view of a milking apparatus embodying the device of Fig. 1; and Fig. 4 is a sectional view of the teat-receiving end of a slightly modified form of teat cup.

Although the invention relates particularly to a new and improved teat cup device, Fig. 3 is employed to show the incorporation of said device in a milking apparatus, thereby effectuating the disclosure of a complete and operable assembly. So, referring first to Fig. 3, it will be seen that the assembly includes, in general, a motor, a reciprocating pump, a milk distributing head and the teat cup device, shown generally at 10, 12, 14 and 16, respectively. The motor 10 and pump 12, mechanically interconnected in the usual or any desired manner, may be of the usual or any desired construction and design, it being sufficient if said pump be of the two-stroke, single cycle type, that is, capable of creating suction during one of its strokes and releasing said suction or developing a slight pressure during its respective reverse stroke. On the other hand, the milk distributing head 14 is connected in fluid communication with and intermediate the pump 12 and the teat cup device 16 so that, as is usual, the pressure and suction conditions established by said pump will simultaneously exist at said head and said cup device, that is, milk will be drawn from the cow through said cup device into said head during one stroke of said pump, and said milk will then be expelled from said head into a desirable container (not shown) therefor during the next or reverse stroke of said pump. Further discussion and construction details of a milking apparatus and its elemental arrangement, which apparatus includes a standard teat cup device, as distinguished from the one shown at 16, may be found in my co-pending application, Serial No. 293,379, filed September 5, 1939, and entitled "Fluid delivery apparatus," the present discussion being thought sufficient to disclose the herein invention because of the latter lying substantially exclusively within the realm of teat cup devices.

Now referring particularly to the teat cup device 16, it will be seen that said device includes an outer shell member 18 and an inner liner member 20, said first member serving, among other things, as a reenforcement for said second member, and the latter serving, among other things, as the actual teat receiver and milk deliverer for the distributing head 14. The elasticities or flexibilities of the members 18 and 20, because of their functions, are relative, said member 18 being preferably metallic or constructed of some other material having little or no elasticity or flexibility, and said member 20 being constructed preferably of rubber or some other non-metallic material having a relatively high elasticity or flexibility.

The inelastic, outer shell member 18 of the teat cup device 16 is hollow, elongated and open at both of its ends, the diameter being preferably tapered from the upper end to the lower end so as to simulate to any desired degree the shape of the cow's teat, the length being somewhat greater than that of said teat for accommodating drawing thereof during the suction strokes of the pump 12, and said upper end being flared radially outwardly to a certain extent while said lower end is flared to a certain extent in the opposite direction, for reasons which will presently appear.

The elastic, inner liner member 20 of the device 16 is also hollow, elongated and open at both of its ends, said member including a head or teat-receiving portion 22 and a tail or milk-delivery portion 24, said portions being integrally connected to each other in end-to-end relationship so that there is free communication between the upper or actual teat-receiving end of said portion 22 and the lower or actual milk-discharging end of said portion 24. The upper end of the head portion 22 of the liner member 20, being open, receives the cow's teat, said portion itself receiving and supporting said teat snugly, though comfortably, therewithin, and the lower end of the tail portion 24 of said member, also being open, receives a duct from the distributing head 14 for delivery of milk from said teat through said duct into said head during the suction strokes of the pump 12.

In the preferred embodiment, namely, that appearing in Fig. 1, the upper end of the upper liner member portion 22 is integrally formed with a cap 26 having a centrally located, teat-receiving aperture 28 therein which provides at said end the only communication between the exterior and interior of said portion and which enables a proper sizing thereof for a sealing fit thereat with the teat. Cap 26, being rubber or of other elastic material out of which member 20 may be constructed, is peripherally flanged radially outwardly and downwardly, as at 30, so as to fit over the upper end of the shell member 18 and provide a sealing fit thereat therewith. In order to overcome the disadvantage of having to replace the liner member 20 after a certain period of use, because of the almost inevitable loss of elasticity occurring in the cap 26 due to said use, the inner wall of said cap, at a short distance radially inwardly of the position whereat said flange directs itself downwardly, is integrally formed with an annular rib 32 which provides said cap and the shell member 18 with two positions of interengagement, the position radially outwardly of said rib being that which may be occupied by said shell member when said cap is new and its elasticity high, and the position radially inwardly of said rib being that which may be occupied by said shell member when said cap is old and worn and its elasticity low. Obviously, when the shell member 18 is occupying the outer of its two positions with respect to the rib 32, the diameter of the aperture 28 is less than when said member is occupying the inner position with respect to said rib, and vice versa, so that, in addition to employing this latter position for compensating for the loss of elasticity in said cap, either of said positions may be employed for controlling the diameter of said aperture with regard to the size of the teat to be received therethrough.

Whereas the upper, cap end of the liner member 20 is supported by and in sealed relationship with the upper end of the shell member 18, the portion of said liner member corresponding with the connection between the head and tail portions 22 and 24 thereof is supported by and in sealed relationship with the lower end of said shell member by means of a cooperating engagement between said lower end and an annular groove 34 formed in and around the outer wall of said liner member at said connection. It will be seen, then, that the head portion 22 of the liner member 20 is confined within the shell member 18 and is so dimensioned as to be spaced annularly along its length from said shell member to provide an elongated, annular, isolated chamber 36 defined by said shell member, said liner head portion and the upper and lower sealed connections therebetween, and that the teat-receiving interior of said liner head portion, which is designated as a chamber 38, is in fluid communication with the lower end of the liner tail portion 24 by means of the hollow interior of the latter. It will be seen further that the tail portion 24 of the liner member 20 resides outwardly of the shell member 18 so that the teat cup device 16 may be readily and operatively disposed between the cow and the milk distributing head 14 of the apparatus shown in Fig. 3.

The lower end of the liner head portion 22 is formed with a plurality of annularly spaced openings 40, said openings preferably being at or at least near the bottom of the chamber 38 so as to be below or at least at the level normally occupied by the discharge end of the teat and serving to intercommunicate the chambers 36 and 38. Therefore, when the teat cup device 16 is arranged over the teat and the apparatus is in operation, suction will be distributed equally in and throughout both chambers 38 and 36, this resulting in the radial expansion or displacement of the head portion 22 toward and relatively to the shell member 18 and the drawing of the teat downwardly relatively to said head portion, said suction, therefore, being applied not only at the end of the teat but along its entire length; then, upon the reverse stroke of the pump, the inherent elasticity of the head portion 22, as well as the suction dissipation, serve to return said head portion to its normal position, which is a position whereat said head portion exerts a squeezing action along the entire length of the teat. It will be seen, then, that the milking operation is performed with the simplest kind of pump and fluid connection thereof to the cup device, said operation comprising a double action (a pull and a squeeze) on the teat for each pump cycle. Complicated tubing, design and apparatus are eliminated and highly efficient results are obtained through the employment of the herein described and claimed device 16. It will also be seen that the squeezing action applied against practically the entire surface of the teat by the liner 20 will permit the retention of the entire cup assembly on the teat during the suction release or pressure stroke and thus eliminate the need for separable caps (referred to below) having teat openings of varying diameters.

The same results obtained by the device 16 shown in Fig. 1 are obtained by the slightly modified device 116 shown in Fig. 4, the only difference being in the construction of the latter as compared with that of the former. For instance, the head portion 122 of the liner member 120 (as distinguished from 22 and 20) may be formed without the cap portion 26—28—30 but itself carry the flange 130 (as distinguished from 30) which is foldable over the top of the shell member 18 for inter-sealing the latter and said head portion thereat. Also, a cap 42 may be sealingly fitted over the upper end of the unit and be provided with a teat-receiving opening 128 similar to the opening 28.

Although the invention has been described with some detail it is not intended that such description be definitive of the limits of the inventive idea. The right is reserved to make such changes in the details of construction and arrangement of parts as will fall within the purview of the attached claims.

What I claim is:

1. In a milking apparatus having a source of suction, a teat cup device comprising an elongated, open-ended hollow shell member of relatively inelastic material, an elongated open-ended hollow liner member of relatively elastic material, said liner member having a portion for receiving the teat of a cow and being supported within and sealed to the ends of said shell member and defining an annular, elongated chamber between said shell member and said liner portion, said liner member also having a portion supported without said shell member in communication with said teat-receiving portion for communicating said teat with the suction source, a single groove in the liner member for anchoring the lower portion of said shell member, said groove being of a width so as to provide a fixed mounting for the shell member, said liner member having an annular elastic top portion with a teat aperture and with a plurality of substantially concentric annular grooves therein approximately equidistant from said shell member anchoring means for selectively receiving the upper edge of said shell member whereby to vary the size of said teat aperture by shifting said shell member edge from one groove to another without shifting said lower portion of said shell member from said shell anchoring groove.

2. In a milking apparatus having a source of suction, a teat cup device comprising an elongated, open-ended hollow shell member of relatively inelastic material, an elongated, open-ended hollow liner member of relatively elastic material, said liner member having a portion for receiving the teat of a cow and being supported within and sealed to the ends of said shell member and defining an annular, elongated chamber between said shell member and said liner portion, said liner member also having a portion supported without said shell member in communication with said teat receiving portion for communicating said teat with the suction source, and a single groove in the liner member for anchoring the lower portion of said shell member, said single groove being of a width as to provide a fixed mounting for said shell member, said liner member having an annular top portion with a teat aperture and with a pair of substantially concentric annular inner and outer grooves therein, said outer groove being disposed slightly above the level of said inner groove for selectively receiving the upper edge of said shell member whereby to vary the size of said teat aperture and stretch said liner member by shifting said shell member edge from one groove to another without shifting said lower portion of said shell member from said shell anchoring groove.

ORLEY R. FROST.